US010044191B2

(12) United States Patent
Allert et al.

(10) Patent No.: US 10,044,191 B2
(45) Date of Patent: Aug. 7, 2018

(54) METHOD FOR OPERATING A BATTERY CONVERTER AND BIDIRECTIONAL BATTERY CONVERTER

(71) Applicant: SMA Solar Technology AG, Niestetal (DE)

(72) Inventors: Claus Allert, Kaufungen (DE); Aleksandra-Sasa Bukvic-Schaefer, Kassel (DE); Johannes Weide, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 247 days.

(21) Appl. No.: 14/986,809

(22) Filed: Jan. 4, 2016

(65) Prior Publication Data
US 2016/0118800 A1   Apr. 28, 2016

Related U.S. Application Data

(63) Continuation of application No. PCT/EP2014/064049, filed on Jul. 2, 2014.

(30) Foreign Application Priority Data

Jul. 3, 2013  (DE) .................. 10 2013 107 012

(51) Int. Cl.
*H02J 3/38* (2006.01)
*H02J 3/32* (2006.01)
(Continued)

(52) U.S. Cl.
CPC ............... *H02J 3/383* (2013.01); *H02J 3/32* (2013.01); *H02J 3/386* (2013.01); *H02J 7/0052* (2013.01);
(Continued)

(58) Field of Classification Search
CPC combination set(s) only.
See application file for complete search history.

(56) References Cited

U.S. PATENT DOCUMENTS 7,834,591 B2   11/2010  Hussain
8,810,066 B2*  8/2014  Moon .................. H02J 3/32
                                          307/65
(Continued)

FOREIGN PATENT DOCUMENTS

DE   19910287 A1    9/2000
WO   2009155445 A2  12/2009

OTHER PUBLICATIONS

International Search Report & Written Opinion of the International Searching Authority dated Nov. 26, 2014 for PCT Application No. PCT/EP2014/064049.
(Continued)

*Primary Examiner* — An Luu
(74) *Attorney, Agent, or Firm* — Eschweiler & Potashnik, LLC

(57) ABSTRACT

The disclosure relates to a method for operating a bidirectional battery converter connected to an AC grid, taking into account the availability of locally generated electrical power. Furthermore, the present disclosure relates to a battery converter comprising measuring devices for detecting the state of charge of a connected battery and comprising a controller, which performs the method.

19 Claims, 6 Drawing Sheets

(51) Int. Cl.
*H02J 7/00* (2006.01)
*H02M 3/04* (2006.01)
*H02M 7/44* (2006.01)
*H02M 7/66* (2006.01)
*H02J 7/35* (2006.01)

(52) U.S. Cl.
CPC ............ *H02M 3/04* (2013.01); *H02M 7/44* (2013.01); *H02M 7/66* (2013.01); *H02J 7/35* (2013.01); *Y02E 10/563* (2013.01); *Y02E 10/566* (2013.01); *Y02E 70/30* (2013.01)

(56) References Cited

U.S. PATENT DOCUMENTS

| | | | | |
|---|---|---|---|---|
| 8,854,004 | B2* | 10/2014 | Lee | H02J 3/383 |
| | | | | 320/101 |
| 8,941,263 | B2 | 1/2015 | Lee | |
| 9,608,451 | B2 | 3/2017 | Sugeno | |
| 9,800,051 | B2* | 10/2017 | Laubenstein | H02J 3/382 |
| 2008/0203820 | A1 | 8/2008 | Kramer et al. | |
| 2010/0306027 | A1 | 12/2010 | Haugh | |
| 2012/0215368 | A1 | 8/2012 | Sharma | |

OTHER PUBLICATIONS

Cramer, Gunther, et al, Modular Battery Inverter: Development of a battery inverter for the modular system technology in PV systems, Final Report, May 1, 1997-Apr. 30, 1999, SMA Solar Technology.

Burger, Bruno, et al, Battery Inverters for modular system technology in PV Systems, Development of Control Technology, Final Report, May 1, 1997-Apr. 30, 1999, SMA Solar Technology.

Rohrich, Deep Discharge Protection/Accu Saver Circuit Diagram Wanted, Forum: Microcontroller and digital electronics, May 27, 2006.

Grid Parallel Operation "Netzparallelbetrieb", Wikipedia Article, Apr. 6, 2010.

M. Bachler, Classification of the operating conditions of Batteries into PV Systems, Workshop of the Solar Energy Research Association, Sep. 23-24, 1996, Cologne.

* cited by examiner

METHOD FOR OPERATING A BATTERY CONVERTER AND BIDIRECTIONAL BATTERY CONVERTER

CROSS REFERENCE TO RELATED APPLICATIONS

This application claims priority to International Patent Application number PCT/EP2014/064049, filed on Jul. 2, 2014, which claims priority to German Patent Application number 10 2013 107 012.4, filed on Jul. 3, 2013, and is hereby incorporated in its entirety.

FIELD

The disclosure relates to a method for operating a bidirectional battery converter connected to an AC grid, taking account of the availability of locally generated electrical power. Furthermore, the present disclosure relates to a battery converter comprising measuring devices for detecting the state of charge of a connected battery and comprising a controller, which performs the method.

BACKGROUND

EP 1 965 483 A1 discloses a supplementary device that is to be arranged between a public AC grid and a standalone generating installation. The supplementary device has an independent disconnection device with which the standalone generating installation can be connected to the AC grid. A grid monitoring device situated in the supplementary device opens the independent disconnection device in the case of grid failure of the public AC grid. Via a second switching element of the supplementary device, the standalone generating installation can be connected to an island grid with a plurality of loads connected to the supplementary device and an island inverter. The island inverter is fed from a battery. The island grid is also connected to the public electricity grid via a switch in the normal case, such that the electricity grid predefines an AC voltage in the island grid. Only if the AC grid fails the island grid is disconnected from the AC grid. Then the island inverter predefines the AC voltage in the island grid. The standalone generating installation can be connected to the AC voltage by means of the second switching element. If the island grid is connected to the public AC grid and is supplied from the latter, the battery of the island inverter is continuously recharged, such that enough energy is available in the event of failures of the AC grid. In this case, the energy flow and the voltage of the battery can be influenced in such a way as to ensure a long lifetime of the battery.

The final report "Modularer Batteriestromrichter: Entwicklung eines Batterie-stromrichters für die modulare Systemtechnik in PV-Anlagen" ["Modular battery converter: development of a battery converter for modular systems engineering in PV installations"], funded by the German Federal Ministry of Education, Science, Research and Technology, funding code: 0329741, discloses control of an island inverter depending on the state of charge of its battery. The state of charge is subdivided into three working ranges "battery normal", "battery low" and "battery overloaded". The working range "battery normal" comprises sub-ranges "N" having a state of charge of between 60% and 100%, "V1" having a state of charge of between 40% and 60% and "V2" having a state of charge of between 20% and 40%. In the range V2 of low availability of the battery, a diesel generator for charging the battery is started if the diesel generator is present in the island grid. The working range "battery low" is divided into a sub-range "A1" having a state of charge of 10% to 20%, a sub-range "A2" having a state of charge of 0% to 10%, and a sub-range "A3" having a state of charge of less than 0%. In the sub-range A1, the loads in the island grid are partly switched off. In the sub-range A2, all loads in the island grid are switched off. In the sub-range A3, the island inverter is also switched off in order to prevent a deep discharge of the battery. The working range "battery overloaded" is subdivided into two "sub-ranges "UE1" and UE2" with increasing overcharging of the battery. In the first sub-range UE1, additional switchable loads are switched on. In the event of the battery voltage rising further into the range UE2, electricity feeders such as photovoltaic and wind power installations connected to the island grid are limited or switched off.

Batteries are also used as buffering storage devices for electrical energy obtained from regenerative primary energies, in order to increase a local self consumption of the electrical energy at the location of its generation. In this case, electrical power is fed to the respective battery via a battery converter for as long as it is able to store electrical power if there is an excess of locally generated electrical power relative to the local power demand. Conversely, electrical power is drawn from the battery for as long as it can be made available by the battery if the locally generated electrical power does not cover the local power demand. In order to prevent the battery from a deep discharge, the battery is kept at a minimum state of charge. Self-discharge of the battery is compensated for by the supply of electrical power, which is drawn from a connected AC grid if necessary.

SUMMARY

The disclosure provides a method for operating a bidirectional battery converter taking into account the availability of locally generated electrical power. A battery is connected to the input side of the bidirectional battery converter. At the beginning of the method, a plurality of operating modes of the battery converter are defined with respect to when electrical power is fed into the battery or when electrical power is output from the battery depending on a state of charge of the battery and on electrical power available on the output side of the battery converter. For this purpose, a plurality of threshold values are defined for the state of charge of the battery. In the case of a first lower threshold value being undershot, a change is made from a first operating mode to a second operating mode. In the first operating mode, electrical power is output from the battery if a local power demand is not covered by the locally generated electrical power and/or if there is a global undersupply of electrical power in the AC grid. Electrical power is fed into the battery in the first operating mode if the locally generated electrical power overshoots the local power demand and/or if there is a global oversupply of electrical power in the AC grid. In the second operating mode, electrical power is output from the battery only if the local power demand is not covered at all. Electrical power is fed into the battery in the second operating mode if locally generated electrical power is available and/or if there is a global oversupply of electrical power. In the case of a state of charge below a second lower threshold value, which is below the first lower threshold value, the battery is charged by electrical power until a first upper threshold value is reached. This first upper threshold value is less than or equal to the first lower threshold value. The charging is carried out if electrical power is actually available on the output side of the battery converter. The first upper threshold value is defined relative to the second lower threshold value such that a first difference between the first upper threshold value and the second lower threshold value covers a standby consumption of the battery converter for a predefined first time period.

A "global undersupply of electrical power" should be understood here to mean a situation in which the demand for electrical power referring to the entire AC grid has to be adapted to a limited supply of electrical power. In such a situation, all loads connected to the AC grid are still supplied sufficiently. Nevertheless, a support of the AC grid by additional electrical energy being fed in is expedient.

When the indication "and/or" is made in the definition of the present disclosure, this should be taken to mean that the conditions linked thereby can be set individually or else jointly, wherein in the latter case it suffices for one of the two conditions to be met in order to initiate the action dependent thereon. In this regard, in the first operating mode, electrical power can be output from the battery if a local power demand is not covered by locally generated electrical power, without a global undersupply of electrical power being taken into consideration. Likewise, in the first operating mode, exclusively if there is a global undersupply of electrical power, electrical power can be output from the battery, without a relation between the local power demand and the locally generated electrical power being taken into consideration. Finally, in the first operating mode, electrical power can be output from the battery if both the local power demand is not covered by locally generated electrical power and if there is global undersupply of electrical power. A corresponding situation applies with the other conditions linked by the indication "and/or".

Independently of the explanation in the last paragraph, for the second operating mode it is advantageous in one embodiment for electrical power to be fed into the battery both if locally generated electrical power is available and if there is global oversupply of electrical power.

In any case, when a change is made from the first operating mode to the second operating mode, the outputting of electrical power from the battery is severely restricted, either to zero or, if the battery is also provided for backup electricity operation, to those situations in which the local power demand is not covered at all because the AC grid is overloaded or has collapsed. In addition, the feeding of electrical power into the battery is extended to situations in which locally generated electrical power is actually available. In this regard, in the second operating mode, on the one hand, a more extensive discharge of the battery is prevented as far as possible. On the other hand, as far as possible, recharging of the battery by means of locally generated electrical power takes place in order that the battery is available again as an active buffer for locally generated electrical power and/or the global supply of electrical power.

If the state of charge of the battery falls further to below the second lower threshold value, which is below the first lower threshold value, the battery, provided that electrical power is actually available at the output of the battery converter, is charged again until its state of charge reaches a first upper threshold value. The amount of electrical energy fed into the battery in this case is coordinated such that it covers a standby consumption of the battery converter for a predefined first time period. Even if no more power is fed into the battery afterwards because no locally generated electrical power is available, the state of charge of the battery will reach the second lower threshold value again after the predefined first time period only. This time period may be fixed at a value of ≥12 hours in one embodiment in order, in the case of electrical power generated locally by means of a photovoltaic generator, to be able to wait overnight to establish whether or not locally generated electrical power is available again the next morning. The first difference between the first upper threshold value, to which the battery is charged with electrical power from the AC grid in case of doubt, and the second lower threshold value should also be chosen at least with a magnitude such that, in the case of the battery being charged until the first upper threshold value is reached, operation of the battery converter is possible with an optimized, e.g., maximum, efficiency. In one embodiment such an efficiency is achieved as a general rule only in the case of a comparatively large charging current into the battery over a minimum time period. In any case, the present disclosure does not pursue the concept of minimizing the first difference between the first upper threshold value and the second lower threshold value in order to draw as little electrical energy as possible from the AC grid during a charging process. Rather, the electrical energy drawn from the AC grid is used as efficiently as possible and the quantity of electrical energy from the AC grid that is fed into the battery is just enough that with a reasonable probability no further feed of this kind need be carried out because the locally generated electrical power will be available again within the first time period.

If a third lower threshold value, which is below the second lower threshold value, is undershot in the method according to the disclosure, a change may be made from the second operating mode to a third operating mode, in which electrical power from the battery is used only for covering the standby consumption of the battery converter and in which electrical power is fed into the battery if electrical power is available on the output side of the battery converter. That is to say that upon the third lower threshold value being undershot, any outputting of electrical energy from the battery toward the outside is stopped. The energy consumption is thus restricted to that of the battery converter. The remaining residual charge of the battery can thus be utilized over a maximum time period for maintaining the operational readiness of the battery converter. As soon as electrical power is available on the output side, the battery is recharged. This does not require a restart of the battery converter, which is in standby operation in the third operating mode.

A second difference between the second lower threshold value and the third lower threshold value, which together mark the sub-range of the second operating mode, in which no electrical power is available on the output side, can cover an amount of energy which is kept available for backup electricity operation in the second operating mode. This means that even in the case of the second lower threshold value being reached, the battery is still charged sufficiently to enable the backup electricity operation of the battery converter and of devices connected thereto until the third lower threshold value is reached.

In one embodiment, as soon as a fourth lower threshold value is undershot, which is below the third lower threshold value in the case of keeping the battery available for backup electricity operation, the battery converter is switched off in the method according to the disclosure. Insofar as no backup electricity operation by means of the battery is provided, already in the second operating mode electrical power from the battery is used only for covering the standby consumption of the battery converter. The fourth lower threshold value then directly follows the second lower threshold value at the lower bound, the battery converter being switched off in the case of said fourth lower threshold value being undershot.

A difference between the lower threshold value that is directly above the fourth lower threshold value, i.e. the smallest lower threshold value above the fourth lower threshold value, and the fourth lower threshold value is chosen in one embodiment such that the standby consumption of the battery converter even without electrical power being fed into the battery is still covered for a predefined second time period. The second time period, in which the battery converter is in standby operation already discussed above and thus enables the battery to be recharged upon the return of output-side power without manual restarting, may be fixed e.g. at 72 hours or generally at a time period in which a collapsed AC grid can be expected to return. The second time period is therefore typically longer than the first time period by a multiple in one embodiment.

In the method according to the disclosure, a fourth difference between the fourth lower threshold value and a fifth lower threshold value, up to which at least manual restarting of the battery converter is still possible, can cover the self-discharge of the battery for a predefined third time period. Since the battery converter is already switched off in the case of the fourth threshold value being undershot, active measures are no longer possible in the case of the fifth lower threshold value being undershot. Rather, the undershooting thereof means that it is no longer readily possible to restart the battery converter for recharging the battery. Accordingly, said fifth threshold value should never be undershot if at all possible. For this reason, the fourth lower threshold value should be set far enough above the fifth lower threshold value, that even a relatively long failure of the AC grid and a simultaneously relatively long failure of the locally generated power can be bridged. In the case of small self-discharge, a residual charge of the battery of a few percentage points suffices, however, to cover a comparatively long third time period of weeks or even months in this way. In practice, this value can be fixed e.g. at 3% SOC (State of Charge) as a measure of the state of charge of the battery.

In the method according to the disclosure, further threshold values may exist above the first lower threshold value, such as a sixth lower threshold value, for example, in the case of the undershooting of which a change is made from a fourth operating mode, in which electrical power is output from the battery if the local power demand is not covered by locally generated electrical power and if there is a global undersupply of electrical power, and in which electrical power is fed into the battery if the locally generated electrical power exceeds the local power demand and if there is a global oversupply of electrical power, to the first operating mode. In this case, in the first operating mode electrical power is output from the battery if there is a global undersupply of electrical power, and electrical power is fed into the battery if the locally generated electrical power exceeds the local power demand and if there is a global oversupply of electrical power. In this embodiment of the method according to the disclosure, a maximization of self consumption of the locally generated electrical power is also performed in the fourth operating mode with the battery, while only a grid service is provided in the first operating mode by provision of positive control power for the AC grid.

A fifth difference between the sixth lower threshold value and the first lower threshold value thus provides a specific average positive control power for the AC grid for a predefined fourth time period. It is clear that a change is made between the fourth operating mode and the first operating mode only if such a positive control power for the AC grid is made available by the battery converter and the states of charge between the sixth lower threshold value and the first lower threshold value are correspondingly reserved for the positive control power for the AC grid.

If in the case of a seventh lower threshold value being undershot, which is above the sixth lower threshold value, a change is made from a fifth operating mode, in which electrical power is output from the battery if a local power demand is not covered by locally generated electrical power and/or if there is a global undersupply of electrical power, and in which electrical power is fed into the battery if there is a global oversupply of electrical power, to the fourth operating mode, as a result a range of states of charge above the sixth lower threshold value is also reserved for the provision of control power for the AC grid, negative control power in this case.

In concrete terms, a difference between maximum charging of the battery, which is taken to mean maximum regular charging, i.e. charging does not cast doubt on the integrity of the battery, and the seventh lower threshold value, may cover a specific average negative control power for a predefined fifth time period.

In one further embodiment of the method according to the disclosure, at least one of the threshold values is altered seasonally. In concrete terms, it is lowered toward summer and raised again after summer. This takes into account the probable short-term reavailability of electrical power generated locally by photovoltaic generators in summer. The concrete profile of the seasonally altered lower threshold values may be cosinusoidal, wherein a year corresponds to a period of the cosine function. It goes without saying that this indication relative to a calendar year corresponds to the northern hemisphere. At the southern hemisphere, where summer is at the turn of the year, the profile of the seasonally altered threshold values correspondingly has a negative cosine shape. As a result of the threshold values lowered in summer, a larger range of states of charge is available for normal operation of the battery converter, in which it is available as a buffer store for the locally generated electrical power.

In the method according to the disclosure, furthermore, at least one of the threshold values may be defined depending on weather forecasts. In this regard, by way of example, in sunny weather, the differences between the threshold values may be reduced because locally generated electrical power will be available again more rapidly than when there is heavy cloud cover. This holds true at least in the case of local generation of electrical power by means of photovoltaic generators.

In the method according to the disclosure, the respective lower threshold values, whose undershooting results in a change between two operating modes, are assigned typically a respective upper threshold value which is greater than or equal to the lower threshold value and whose overshooting results in a change in the opposite direction between the same operating modes. In this case, the respective upper threshold value may be at least somewhat above the associated lower threshold value in order to avoid unstable states of the battery converter with regard to its operating state, i.e. fast repeated changing between its operating modes.

A battery converter according to the disclosure comprises measuring devices for detecting the state of charge of a connected battery and a controller, which performs the method according to the disclosure. The various threshold values employed in the method according to the disclosure may be input into the controller externally. However, the controller may also itself define these threshold values on the basis of external inputs and/or dedicated measurement values in relation to the battery connected on the input side and output-side parameters.

In concrete terms, the battery converter is a DC/AC converter for direct connection to an AC grid or an island grid that may be connected to an AC grid, or a DC/DC converter for connection to an input-side DC Link circuit of a DC/AC converter connected to an AC grid on the output side. In the latter case, the DC Link circuit is provided for connecting at least one further electricity source in parallel with the battery converter.

Advantageous developments of the disclosure are evident from the patent claims, the description and the drawings. The advantages of features and of combinations of a plurality of features as mentioned in the description are merely by way of example and can take effect alternatively or cumulatively, without the advantages necessarily having to be afforded by embodiments according to the disclosure. Without the subject matter of the accompanying patent claims being altered thereby, the following holds true with regard to the disclosure content of the original application documents and of the patent: further features can be gathered from the drawings. The combination of features of different embodiments of the disclosure or of features of different patent claims is likewise possible in a departure from the chosen dependency references of the patent claims and is suggested hereby. This also concerns such features which are illustrated in separate drawings or are mentioned in the description thereof. These features can also be combined with features of different patent claims. It is likewise possible to omit features presented in the patent claims for further embodiments of the disclosure.

The features mentioned in the patent claims and the description should be understood, with regard to their number, such that exactly this number or a greater number than the number mentioned is present, without the need for explicit use of the adverb "at least". Therefore, if an element is mentioned, for example, this should be understood to mean that exactly one element, two elements or more elements are present. These features can be supplemented by other features or be the sole features of which the respective product consists.

The reference signs contained in the patent claims do not restrict the scope of the subjects protected by the patent claims. They merely serve the purpose of making the patent claims more easily understood.

BRIEF DESCRIPTION OF THE DRAWINGS

The disclosure is explained and described in further detail below on the basis of exemplary embodiments with reference to the accompanying drawings.

DETAILED DESCRIPTION

Figure 1:
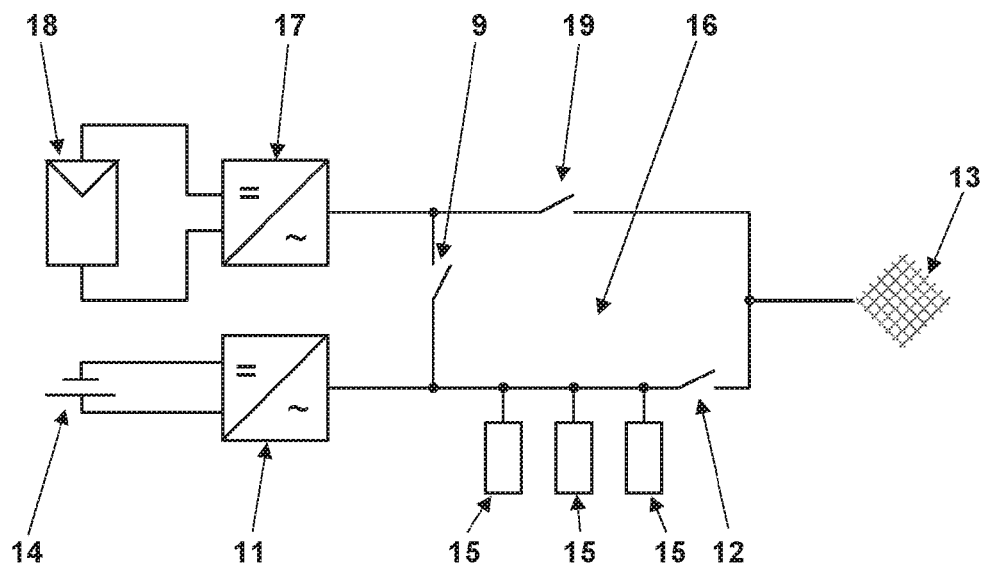
FIG. 1 is a schematic diagram that shows one environment in which a method according to the disclosure and a battery converter according to the disclosure can be used.

The disclosure relates to a method for operating a bidirectional battery converter connected to an AC grid, taking into account the availability of locally generated electrical power. Furthermore, the present disclosure relates to a battery converter comprising measuring devices for detecting the state of charge of a connected battery and comprising a controller, which performs the method.

The battery converter may be in particular a DC/AC converter which is directly connected to the AC grid or to an island grid which is normally connected to the AC grid. Such a battery converter is also referred to as a battery inverter.

If the battery converter according to the disclosure is embodied as a battery inverter, it may be designed as an island inverter that is able to predefine an AC voltage in the island grid if the island grid has been disconnected from the AC grid, e.g. in the case of a breakdown of the AC grid. This mode of operation of the battery converter is called backup electricity operation hereinafter.

The battery converter may furthermore be a DC/DC converter that is connected to a DC Link circuit of a DC/AC converter which is connected on its output side to the AC grid or to an island grid that is normally connected to the AC grid. It may at least one further electricity source, such as a photovoltaic generator, for example, be connected to the DC Link circuit of the DC/AC converter, too.

In one embodiment locally generated electrical energy, the availability of which is taken into account during the operation of the battery converter, is generated from a regenerative primary energy, and in particular by means of a photovoltaic generator.

The meaning of the term "AC grid" within this disclosure is that the AC voltage of the grid is predefined by a different device than the inverter operated according to the disclosure or the inverter itself according to the disclosure. It may be a local or supraregional, public or private AC grid.

The term "a battery" which is connected to the battery converter, may mean an individual battery unit. However, the battery may also have a plurality of units interconnected in parallel and/or in series. In particular, it will regularly have a multiplicity of individual cells.

The meaning of the terms "lower" threshold values and the "undershooting" of lower threshold values in this description and the patent claims are directed to the fact that a specific action is intended to take place if a measurement value falls from a value above the threshold value to a value below the threshold value. An upper threshold value is correspondingly a threshold value for which an action is intended to take place if a measurement value rises from a value below the threshold value to a value above the threshold value. In this case, the respective action can also already be initiated if the changing value of the respective measurement value is equal to the lower or upper measurement value. However, it is often simpler to ascertain whether the measurement value undershoots the respective lower threshold value or overshoots the respective upper threshold value.

In the present description and the patent claims the terms "first", "second", "third" etc. threshold value or operating mode or time period or a "first", "second" etc. difference shall not indicate any rank or sequence at all. Rather, these indications are intended exclusively to facilitate reference to the respective threshold values, operating modes, time periods and differences.

The problem addressed by the disclosure is that of presenting a method for operating a bidirectional battery converter taking into account the availability of locally generated electrical power, which method ensures a maximum functionality of the battery converter in conjunction with maximum economic viability and minimum loading of the battery. Furthermore, the intention is to present a corresponding battery converter.

FIG. 1 illustrates highly schematically the output-side connection of a bidirectional battery converter 11, which is embodied as a DC/AC converter, to an AC grid 13 via a disconnection device 12. On the input side, a battery 14 is connected to the battery converter 11. Upstream of the disconnection device 12, loads 15 are connected to the battery converter 11. Upon failure of the AC grid 13 and thereupon an opening of the disconnection device 12, the battery converter 11 acts as an island inverter that can form an AC voltage in an island grid 16 extending as far as the disconnection device 12. An inverter 17 with a photovoltaic generator 18 connected on its input side provides locally generated electrical power. The inverter 17 is connectable to the grid 13 via a disconnection device 19, and to the island grid 16 via a switching point 9. Upon failure of the AC grid 13, the inverter 17 disconnects from the AC grid 13. It can be connected to the island grid 16 again via the switching point 9 after synchronization with the AC voltage provided by the battery converter 11. The battery converter 11 together with the battery 14 additionally acts as a buffering storage for locally generated electrical power from the photovoltaic generator 18, in order to maximize a self consumption of this power at the location where it is generated. For this purpose, the battery converter 11 has measuring devices (not illustrated separately) for detecting a charge state of the battery 14 in the form of its so-called state of charge (SOC) and a control device, which defines the present operating mode of the battery converter 11 depending on the detected state of charge and the availability of locally generated electrical power from the photovoltaic generator 18.

Figure 2:
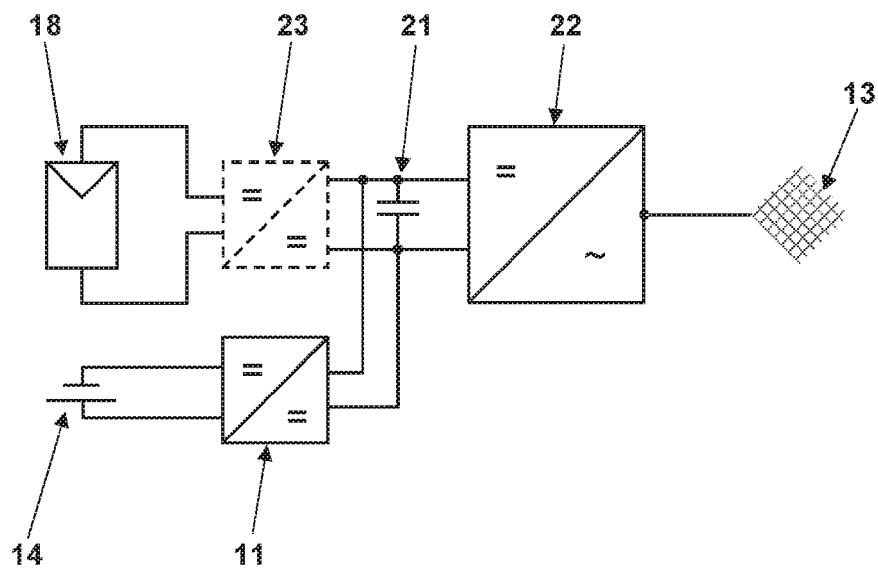
FIG. 2 is a schematic diagram that shows another environment in which a method according to the disclosure and a battery converter according to the disclosure can be used.

FIG. 2 shows that the battery converter 11 may also be designed as a DC/DC converter connected to an input-side DC Link circuit 21 of a DC/AC converter 22, which is connected to the AC grid 13 on the output side. A photovoltaic generator 18 as a further electricity source is connected to the DC Link circuit 21 in parallel with the battery converter 11. In this case, dashed lines indicate an optional DC/DC converter 23 for voltage matching, via which the photovoltaic generator 18 may be connected to the DC Link circuit 21. Even though the battery converter 11 here outputs a DC current, in principle it has the same functions as the battery converter 11 in accordance with FIG. 1, except that the battery converter 11 in accordance with FIG. 2 cannot form an AC voltage in an island grid. However, the DC/AC converter 22 in accordance with FIG. 2 is able to do this, even though FIG. 2 does not illustrate an island grid that can be isolated from the AC grid 13.

Hereinafter, a description is given of various embodiments of operation according to the disclosure of the battery converter 11 in accordance with FIG. 1 or 2 depending on the state of charge of its associated battery 14 connected on the input side and availability of locally generated electrical power from the photovoltaic generator 18.

Figure 3:
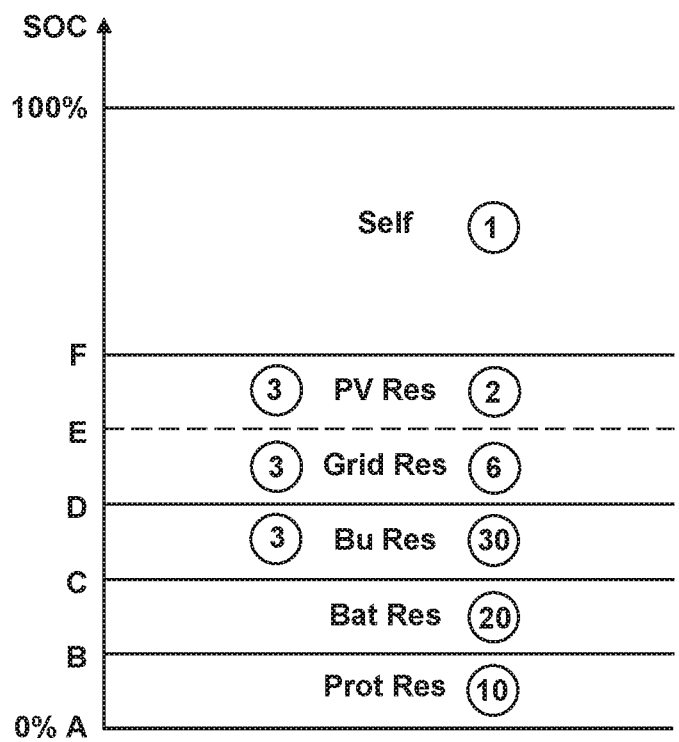
FIG. 3 is a plot of a state of charge (SOC) as a measure of the state of charge of a battery together with threshold values at which a change is made between different operating modes of a battery converter connected to the battery in a first embodiment of the method according to the disclosure.

In FIG. 3, the state of charge in the form of the SOC of its battery is plotted from 0% to 100%. Specific SOC values are marked as threshold values A, B, C, D, E, F. In this case, the differences between the threshold values and likewise their separations with respect to the SOC of 100% are not illustrated to scale. Rather, exclusively the ordering of the threshold values A to F is reproduced correctly here.

The threshold values B to F are used to define the operating mode of the battery converter 11 in accordance with FIG. 1. The operating mode determines when electrical power is output from the battery 14 and, conversely, electrical power is fed into the battery 14. In a range of the SOC above the threshold value F, which here is also designated as first lower threshold value, and up to an SOC of 100%, the battery converter 11 utilizes the connected battery 14 in order to maximize a self consumption of locally generated electrical power. In particular, this electrical power is generated from a regenerative primary energy source, and very particularly from the photovoltaic generator 18 in accordance with FIG. 1. Furthermore, however, electrical power from the AC grid 13 in accordance with FIG. 1 is also available at the output of the battery converter 11. This electrical power can be fed into the battery 14 by the battery converter 11, too. The operating mode having the main aim of maximizing the self consumption is also designated by "Self" for short in this description. Since it is put into practice above the first lower threshold value F in accordance with FIG. 3, it is here additionally the operating mode which may be meant by the "first operating mode" in this description and the patent claims. As this first operating mode, it is provided with the reference sign 1 in FIG. 3.

If the SOC undershoots the first lower threshold value F, the battery converter 11 changes from its first operating mode 1 to a second operating mode 3, in which it establishes the outputting of electrical power from the battery and waits for the availability of locally generated electrical power for recharging the battery to above the threshold value F. If the SOC falls below a second lower threshold value D in this case, insofar as electrical power is available from the AC grid connected on the output side, the battery is charged with this electrical power up to a first upper threshold value E in order, even without availability of locally generated electrical power, to endure again for a relatively long time until the second lower threshold value D is undershot anew. The range of the second operating mode 3 is subdivided here into three sub-ranges 2, 6 and 30. In the uppermost sub-range 2 above the first upper threshold value E, the battery is recharged only with locally generated electrical power. Therefore, the difference between the first lower threshold value F and the first upper threshold value E is also designated as "PV Res" for "photovoltaic reserve".

Between the first upper threshold value E and the second lower threshold value D there extends the second sub-range 6, in which, coming from an SOC below the second lower threshold value D, the charging of the battery also takes place with electrical power from the AC grid. A difference between the first upper threshold value E and the second lower threshold value E is also designated here as Grid Res, standing for Grid Reserve. Below the second lower threshold value D there follows a sub-range 30 of the second operating mode 3, right into which, upon failure of the AC grid, electrical power from the battery is used to maintain backup electricity operation with the aid of the battery converter. In this case, a difference between the second lower threshold value D and the third lower threshold value C marks an energy reserve which is available for the backup electricity operation and which is designated here as "Bu Res" standing for "Backup Reserve".

If the third lower threshold value C is also undershot by the SOC of the battery, the battery converter undergoes transition to a fourth operating mode 20, in which electrical power from the battery is expended only for the standby consumption of the battery converter 11 itself. In this way, the battery converter 11 still endures for a comparatively long time in order, when electrical power for charging the battery 14 is available again at its output, to be able to resume its full function immediately. A difference between the third threshold value C and the next smaller fourth lower threshold value B is therefore also designated as "Bat Res" for battery reserve. In the case of an SOC below the fourth threshold value B, the battery converter 11 is switched off. That is to say that the operating mode 10 is "off". A difference between the fourth lower threshold value B and a fifth lower threshold value A in the case of the SOC of 0% is also designated here as "Prot Res" standing for Protection Reserve. This amount of energy ensures that the battery converter 11, upon the return of the AC grid, is restartable at least manually, which is possible down to the lower threshold value A. In this case, the Prot Res also covers the self-discharge of the battery 14 over relatively long time periods, even if it makes up only a few percent of the SOC.

If the battery 14 can be recharged on account of newly available electrical power at the output of the battery converter 11, a change is made between the operating states 10, 20, 3 and 1 in the opposite order to previously with decreasing SOC. In this case, upper threshold values at which the respective change is made can in each case be somewhat higher than the lower threshold values B, C, D and F, in order to avoid jumping back and forth between two adjacent operating modes. If electrical power is available from the AC grid 13, from low SOC the battery is recharged up to the upper threshold value E with electrical power which can also originate from the AC grid 13, and only thereabove exclusively with locally generated electrical energy. In this respect, here the second operating mode 3 is then subdivided between the sub-ranges 6 and 2.

Figure 4:
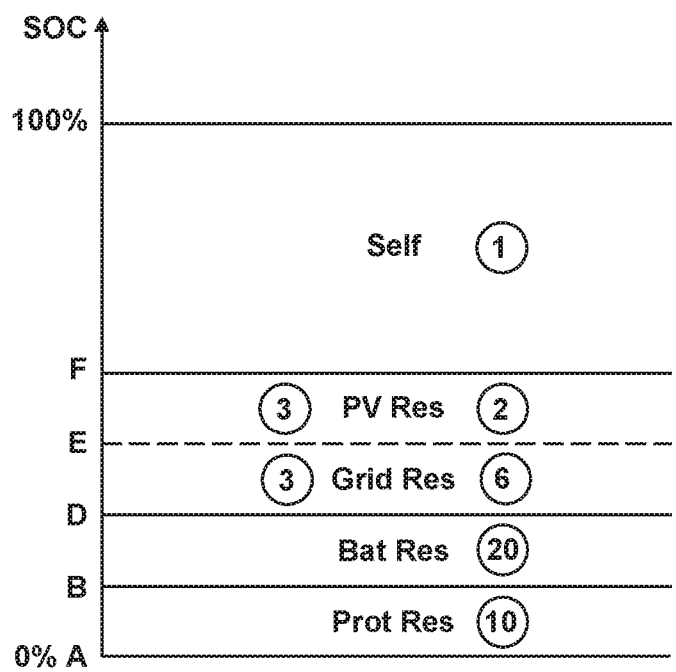
FIG. 4 is a plot, corresponding to FIG. 3, for a battery converter which, in contrast to the battery inverter whose operating modes are plotted in FIG. 3, is not provided for backup electricity operation.

FIG. 4 illustrates another embodiment of the present disclosure, in which, in comparison with FIG. 3, the third lower threshold value C and accordingly the sub-range 30 of Bu Res, which is kept available for backup electricity operation in the second operating mode 3, the sub-range lying between the third lower threshold value C and the second threshold value D thereabove, are omitted. Instead, the range of Bat Res with the second operating mode 20 directly follows the second lower threshold value D toward the lower bound, and next, in the case of the fourth lower threshold value B being undershot, the battery converter is switched to the operating mode 10 "off". This sequence of the lower threshold values F, D and B is applicable if the battery converter need not keep a specific energy reserve Bu Res for backup electricity operation upon failure of the AC grid connected to the battery converter on the output side.

Figure 5:
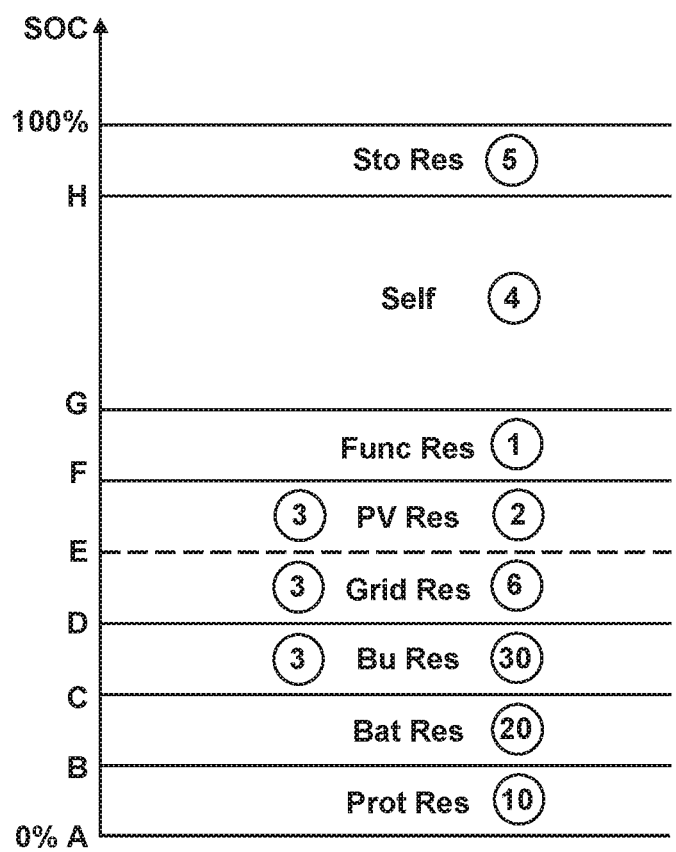
FIG. 5 is a plot, corresponding to FIG. 3, for a battery converter which, in comparison with the battery converter whose operating modes are plotted in FIG. 3, is additionally designed for providing positive and negative control power for an AC grid connected on the output side.

FIG. 5 shows in addition a sixth and seventh lower threshold value G and H, respectively, which are kept available on both sides of the operating mode Self, in which a self consumption of locally generated electrical energy is maximized, energy reserves "Func Res" and "Sto Res" for providing positive control power and negative control power for the AC grid. These functions, also designated as grid services, serve for stabilizing the AC grid; in this case, energy from the AC grid is conducted into the battery if overall more energy than is consumed is fed into the AC grid, and, conversely, energy from the battery is fed to the AC grid if the global consumption exceeds the feed-in. In this case, "Func Res" stands for "Function reserve" and "Sto Res" stands for "Storage Reserve". The sixth lower threshold value G separates the range of the operating mode Self, which here is a fourth operating mode 4 even though it corresponds to the operating mode Self in accordance with FIG. 1, from a range of the first operating mode 1 directly above the first lower threshold value F. In the operating mode 1, here electrical power is no longer output from the battery in order to increase the self consumption of locally generated electrical power, but rather only in order to stabilize the electricity grid connected to the battery converter on the output side. In the range of the Sto Res, a fifth operating mode 5 of the battery converter 11 is then active, in which although it feeds excess electrical power from the AC grid into the battery, it no longer feeds locally generated power. Rather, this locally generated power, if it is in excess, is limited. From this fifth operating mode 5, the battery converter 11 undergoes transition to the fourth operating mode 4 in the case of the seventh lower threshold value H being undershot. If positive and negative control power are to be provided by the battery converter 11 for the AC grid 13 connected on the output side, the application of the additional sixth and seventh lower threshold values G and H is expedient. However, the additional sixth lower threshold value G can also be dispensed with if both positive and negative control power are to be provided for the AC grid, particularly if the first upper threshold value E and the second lower threshold value D are relatively far below the first lower threshold value F, such that the provision of positive control power in the second operating mode 3 is not associated with the risk of the SOC of the battery already falling below the second lower threshold value D shortly afterward, such that the battery is charged from the AC grid.

Figure 6:
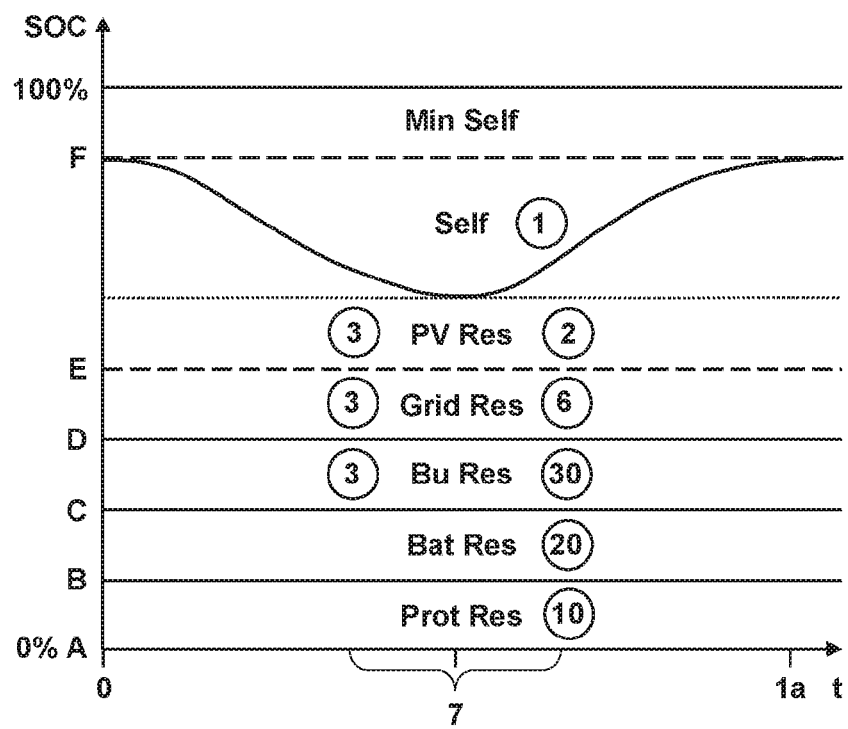
FIG. 6 is a plot, corresponding in principle to FIG. 3, of the SOC of the battery and the associated operating modes of the battery converter, wherein here the plot is made over the time period of a year over which one of the threshold values changes seasonally between two operating modes.

In FIG. 6, in addition to FIG. 3 time is plotted in the direction of the abscissa. In concrete terms, a time period of a year is illustrated here. The first lower threshold value F is altered seasonally over this year. It is lower in summer 7 and thus increases the range of the operating mode Self for the self consumption because in summer electrical energy generated locally by the photovoltaic generator 18, even after a decrease, with high probability is available again in the short term. In the other seasons, the first lower threshold value F rises toward winter, where it is comparatively close to an SOC of 100% and leaves only a sub-range "Min Self" for optimizing the self consumption, which is provided over the whole year.

Figure 7:
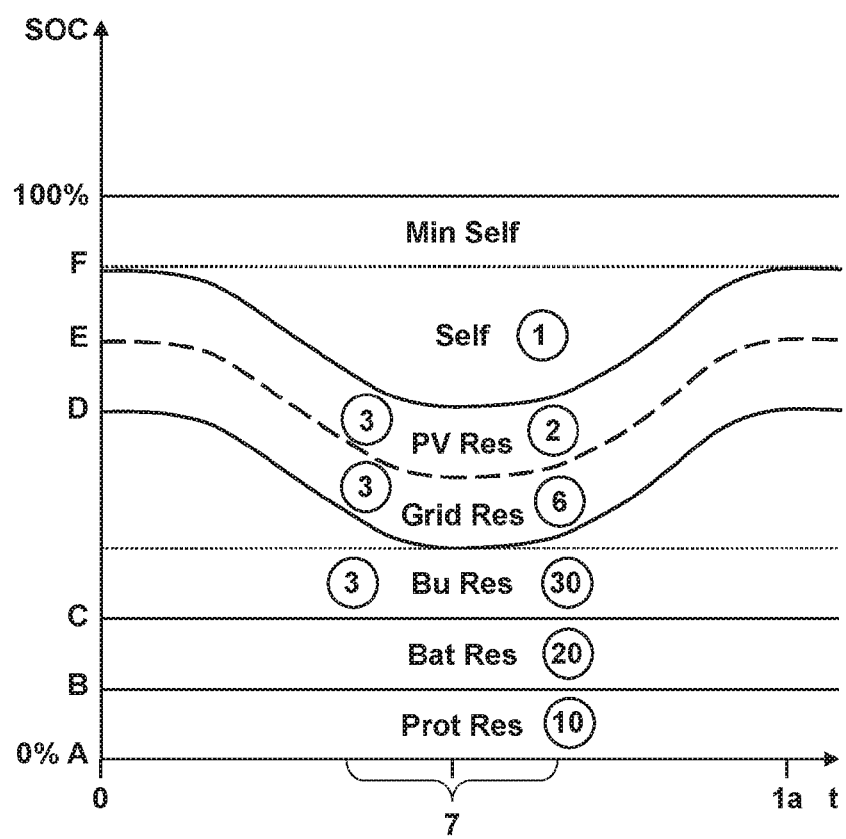
FIG. 7 is a plot corresponding to FIG. 6, wherein here three threshold values change seasonally over the year.

FIG. 7 illustrates, in an illustration corresponding to FIG. 6, a seasonal variation not only of the first lower threshold value F but also of the second lower threshold value D and of the first upper threshold value E therebetween, in order to adapt the operating modes 1 and 3 of the battery converter to the special seasonal features to an even greater extent until the battery converter has to be switched to standby operation in the case of the third threshold value C being undershot. Both in FIG. 6 and in FIG. 7, the seasonal variation of the first lower threshold value F and also the seasonal variation of the second lower threshold value D and of the first upper threshold value E can correspond to a period of a cosine function of the duration of a year. At the northern hemisphere this involves the calendar year, for instance, and at the southern hemisphere a year that begins in the middle of winter, such that the threshold values D, E and F assume their smallest values in summer there as well.

Figure 8:
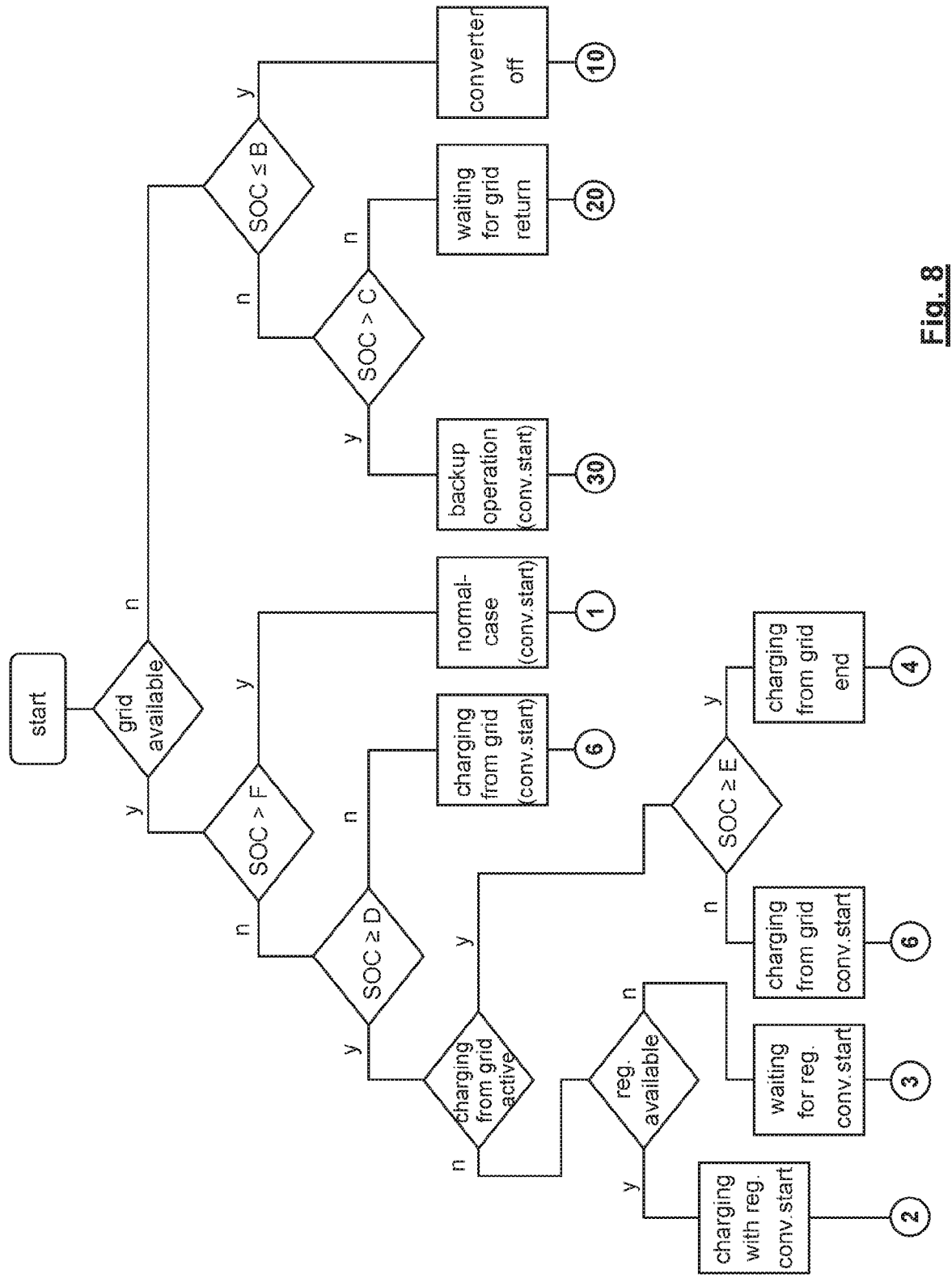
FIG. 8 is a decision tree illustrating the application of the threshold values in accordance with FIG. 3, 6 or 7 in the corresponding embodiments of the method according to the disclosure.

The changes in the operating modes as described in connection with the previous figures are reproduced in the form of a decision tree in FIG. 8 and in the form of a decision network in FIG. 9. In this case, the decision tree is approached from the start at each point in time.

Figure 9:
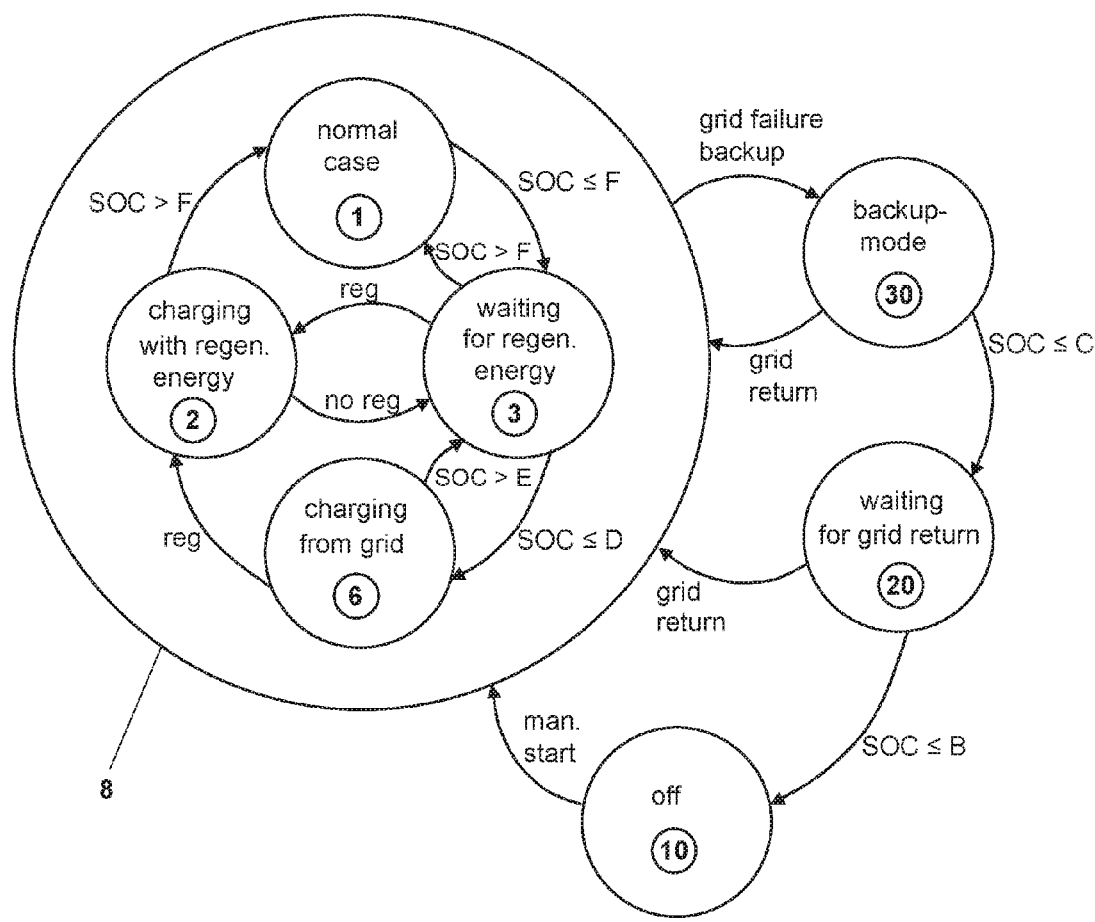
FIG. 9 is a state diagram illustrating the different operating modes of the battery converter in the embodiment of the disclosure in accordance with FIGS. 3 and 6 to 8.

In FIG. 9, a region enclosed by a line 8 is that in which the AC grid connected to the battery converter on the output side provides electrical power. Everything outside the line 8 corresponds to a grid failure. In FIG. 9, "reg" and "no reg" indicate available locally generated electrical power and non-available locally generated electrical power, respectively.

We claim:

1. A method for operating a bidirectional battery converter connected to an AC grid, taking into account an availability of locally generated electrical power, comprising:
defining a plurality of operating modes of the battery converter with regard to feeding electrical power into a battery connected on an input side thereof and outputting electrical power from the battery depending on a state of charge of the battery and on electrical power available on an output side thereof;
defining a plurality of threshold values for the state of charge of the battery; and
in a case of a first lower threshold value of the state of charge of the battery being undershot, changing from a first operating mode, in which electrical power is output from the battery if a lower power demand is not covered by a locally generated electrical power and/or if there is a global undersupply of electrical power in the AC grid, and in which electrical power is fed into the battery if the locally generated electrical power exceeds the local power demand and/or if there is a global oversupply of electrical power in the AC grid, to a second operating mode, wherein in the second operating mode no electrical power is output from the battery or electrical power is output from the battery only if the local power demand is not covered at all, and electrical power is fed into the battery if locally generated electrical power is available and/or if there is a global oversupply of electrical power in the AC grid, and
wherein in a case of the state of charge of the battery being below a second lower threshold value, which is below the first lower threshold value, if electrical power is available on the output side, the battery is charged by electrical power being fed in until a first upper threshold value is reached, which is less than or equal to the first lower threshold value, wherein a first difference between the first upper threshold value and the second lower threshold value is chosen so as to cover a standby consumption of the battery converter for a predefined first time period.

2. The method as claimed in claim 1, wherein in a case where the battery is charged until the first upper threshold value is reached, the battery converter is operated with an optimized efficiency.

3. The method as claimed in claim 1, wherein in the second operating mode electrical power is output from the battery if the local power demand is not covered at all, wherein in a case of a third lower threshold value being undershot, which is below the second lower threshold value, a change is made from the second operating mode to a third operating mode, in which electrical power from the battery is used only for covering a standby consumption of the battery converter and electrical power is fed into the battery if electrical power is available on the output side thereof.

4. The method as claimed in claim 3, wherein a second difference between the second lower threshold value and the third lower threshold value covers a predefined amount of energy for backup electricity operation in the second operating mode.

5. The method as claimed in claim 3, wherein in a case of a fourth lower threshold value being undershot by the state of charge of the battery, which is below the third lower threshold value, the battery converter is switched off.

6. The method as claimed in claim 1, wherein in the second operating mode no electrical power is output from the battery, wherein in a case of a fourth lower threshold value being undershot by the state of charge of the battery, which is below the second lower threshold value, the battery converter is switched off.

7. The method as claimed in claim 5, wherein a third difference between the smallest lower threshold value that is above the fourth lower threshold value and the fourth lower threshold value covers the standby consumption of the battery converter for a predefined second time period.

8. The method as claimed in claim 5, wherein a fourth difference between the fourth lower threshold value and a fifth lower threshold value, up to which at least manual restarting of the battery converter is still possible, covers a self-discharge of the battery for a predefined third time period.

9. The method as claimed in claim 1, wherein in a case of a sixth lower threshold value being undershot, which is above the first lower threshold value, the change is made from a fourth operating mode, in which electrical power is output from the battery if the local power demand is not covered by locally generated electrical power and if there is a global undersupply of electrical power, and in which electrical power is fed into the battery if the locally generated electrical power exceeds the local power demand and if there is a global oversupply of electrical power, to the first operating mode, wherein in the first operating mode electrical power is output from the battery if there is a global undersupply of electrical power, and electrical power is fed into the battery if the locally generated electrical power exceeds the local power demand and if there is a global oversupply of electrical power.

10. The method as claimed in claim 9, wherein a fifth difference between the sixth lower threshold value and the first lower threshold value provides a specific average positive control power for a predefined fourth time period.

11. The method as claimed in claim 9, wherein in a case of a seventh lower threshold value being undershot, which is above the sixth lower threshold value, a change is made from a fifth operating mode, in which electrical power is output from the battery if a local power demand is not covered by locally generated electrical power and/or if there is a global undersupply of electrical power, and in which electrical power is fed into the battery if there is a global oversupply of electrical power, to the fourth operating mode.

12. The method as claimed in claim 11, wherein a sixth difference between a maximum charging of the battery and the seventh lower threshold value provides a specific average negative control power for a predefined fifth time period.

13. The method as claimed in claim 1, wherein at least one threshold value is lowered toward summer and is raised again after summer.

14. The method as claimed in claim 13, wherein an annual profile of the at least one threshold value resulting from the lowering is cosinusoidal.

15. The method as claimed in claim 1, wherein at least one threshold value is defined depending on weather forecasts.

16. The method as claimed in claim 1, wherein at least one lower threshold value, whose undershooting results in a change between two operating modes is assigned an upper threshold value which is greater than or equal to the lower threshold value and whose overshooting results in a change in the opposite direction between the same operating modes.

17. A battery converter, comprising:
one or more measuring devices configured to detect the state of charge of a connected battery; and
a controller configured to receive the state of charge of the battery from the one or more measuring devices, and further configured to:
define a plurality of operating modes of the battery converter with regard to feeding electrical power into a battery connected on an input side thereof and outputting electrical power from the battery depending on a state of charge of the battery and on electrical power available on an output side thereof;
define a plurality of threshold values for the state of charge of the battery; and
in a case of a first lower threshold value of the state of charge of the battery being undershot, change from a first operating mode, in which electrical power is output from the battery if a lower power demand is not covered by a locally generated electrical power and/or if there is a global undersupply of electrical power in the AC grid, and in which electrical power is fed into the battery if the locally generated electrical power exceeds the local power demand and/or if there is a global oversupply of electrical power in the AC grid, to a second operating mode, wherein in the second operating mode no electrical power is output from the battery or electrical power is output from the battery only if the local power demand is not covered at all, and electrical power is fed into the battery if locally generated electrical power is available and/or if there is a global oversupply of electrical power in the AC grid, and wherein in a case of the state of charge of the battery being below a second lower threshold value, which is below the first lower threshold value, if electrical power is available on the output side, the battery is charged by electrical power being fed in until a first upper threshold value is reached, which is less than or equal to the first lower threshold value, wherein a first difference between the first upper threshold value and the second lower threshold value is chosen so as to cover a standby consumption of the battery converter for a predefined first time period.

18. The battery converter as claimed in claim 17, wherein the controller is configured to define all threshold values on the basis of external inputs and/or dedicated measurement values.

19. The battery converter as claimed in claim 17, wherein the battery converter is a DC/AC converter for direct connection to an AC grid or an island grid that can be connected to an AC grid, or a DC/DC converter for connection to an input-side DC Link circuit of a DC/AC converter connected to an AC grid on the output side, wherein at least one further electricity source can be connected to the DC Link circuit in parallel with the battery converter.

* * * * *